(No Model.)
E. E. LOGAN.
FORCE FEED ATTACHMENT FOR THRASHING MACHINES.
No. 465,714. Patented Dec. 22, 1891.
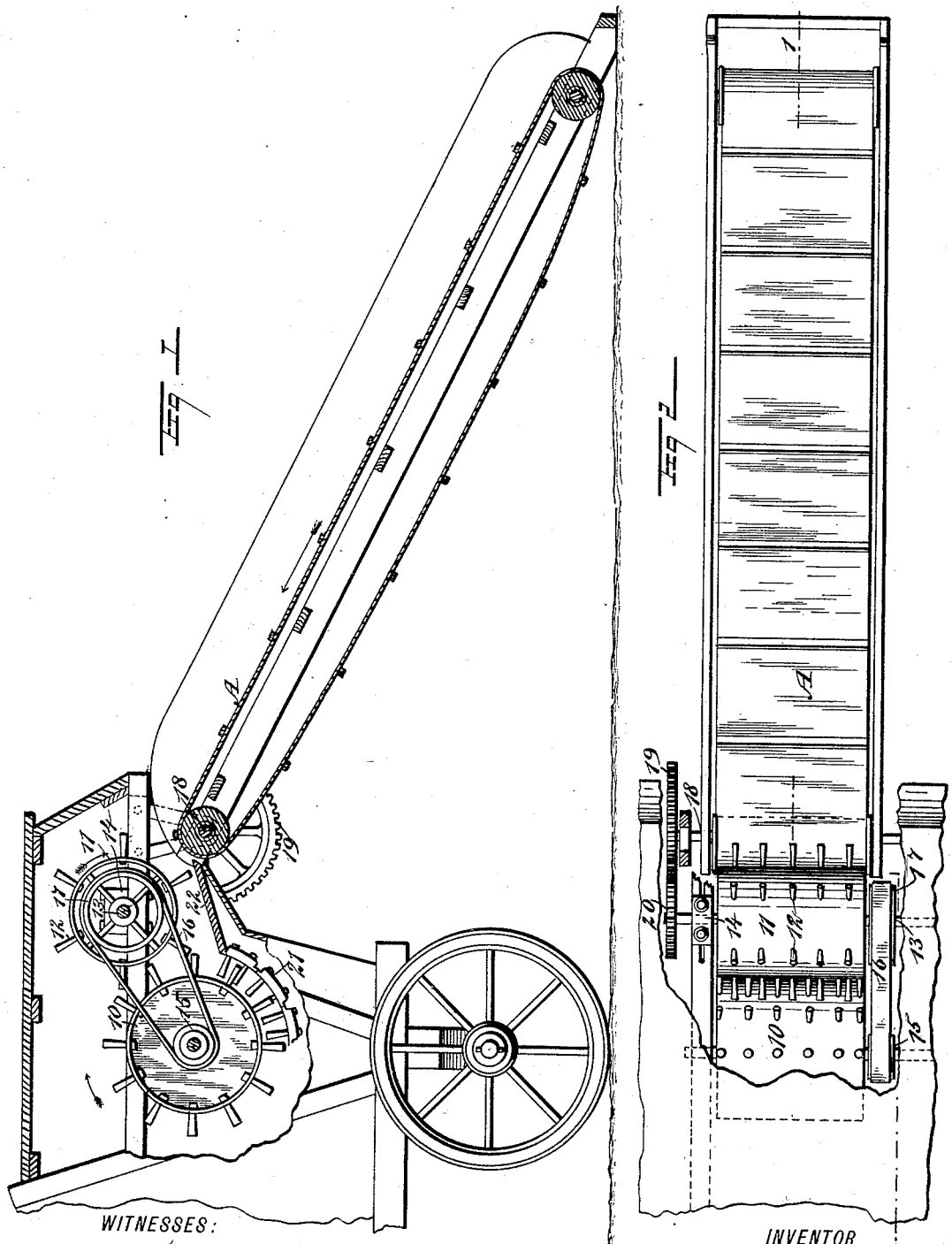

UNITED STATES PATENT OFFICE.

ELMER E. LOGAN, OF LARNED, KANSAS.

FORCE-FEED ATTACHMENT FOR THRASHING-MACHINES.

SPECIFICATION forming part of Letters Patent No. 465,714, dated December 22, 1891.

Application filed July 13, 1891. Serial No. 399,324. (No model.)

*To all whom it may concern:*

Be it known that I, ELMER E. LOGAN, of Larned, in the county of Pawnee and State of Kansas, have invented a new and Improved Force-Feed Attachment for Thrashing-Machines, of which the following is a full, clear, and exact description.

My invention relates to an improved feeding attachment for thrashing-machines, and has for its object to provide a force-feed of simple, durable, and economic construction and capable of attachment to any thrashing-machine, whereby the material to be thrashed may be delivered in suitable quantities and at proper intervals to the thrashing-cylinder of the machine; and the invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a central vertical section through the attachment and a portion of the thrashing-machine, the section being taken practically on the line 1 1 of Fig. 2; and Fig. 2 is a plan view of the attachment, the casing of the machine being broken away.

The thrashing-cylinder 10 may be of any suitable or approved construction, and above the thrashing-cylinder a feed-cylinder 11 is held to revolve, the said feed-cylinder being of smaller diameter than the thrashing-cylinder. The feed-cylinder is provided with a series of peripheral teeth 12, which teeth are adapted to register with or pass between the teeth upon the thrashing-cylinder. The feed-cylinder is mounted upon a shaft 13, which shaft is journaled in bearings 14, located within the thrashing-machine above the mouth thereof, and the bearings 14 are so constructed that the feed-cylinder may be adjusted to or from the thrashing-cylinder. Both the thrashing and feed cylinders turn in the same direction, and the feed-cylinder is preferably made to turn one-half as many times per minute as the thrashing-cylinder. To that end upon the shaft of the thrashing-cylinder a small pulley 15 is secured, which is connected by a belt 16, with a larger pulley 17, located upon the shaft of the feed-cylinder.

At the mouth of the thrashing-machine the upper end of a conveyer A is located, which conveyer may be of any suitable or approved construction, and the lower end of the conveyer rests upon the ground. The conveyer ordinarily consists of a suitable casing, hinged or otherwise attached to the frame of the thrashing-machine in a manner to be adjustable with reference to inclination, and an endless belt carried by the frame, which belt is rotated by attaching to the shaft 18 of its upper drum a gear 19, meshing with a gear 20, fast upon one extremity of the shaft carrying the feed-cylinder; but instead of the gearing shown the conveyer may be driven by belts and pulleys suitably placed to better facilitate the adjustment of the casing. The usual toothed concave 21 is arranged beneath the thrashing-cylinder, and the upper portion of this concave and the top of the conveyer are connected by an inclined board or plate 22, made either of metal or of wood.

In operation the unthrashed straw is placed upon the elevator and is carried upward to the thrashing-machine by the same. When it reaches the top of the conveyer or elevator, the straw is taken in suitable quantities by the teeth of the feed-cylinder and carried over the inclined board or plate 22 and delivered between the toothed concave 21 and the teeth of the thrashing-cylinder. Thus a regular, continuous, and uniform force-feed is obtained and exceedingly satisfactory results are also obtained in the process of thrashing.

It is evident that the device is exceedingly simple and economic, and that it may be readily applied to any thrashing-machine.

Having thus described my invention, I claim as new and desire to secure by Letters Patent—

The combination, with the thrashing-cylinder, the concave, and the inclined board or plate 22, of the toothed feed-cylinder above and in advance of the thrashing-cylinder, adjustable toward and from the same and having its teeth passing between those of the said thrashing-cylinder, and the carrier or elevator belt delivering to the feed-cylinder, substantially as described.

ELMER E. LOGAN.

Witnesses:
J. J. NESBIT,
JESSE DITSON.